United States Patent
Thomas et al.

(10) Patent No.: US 10,211,938 B2
(45) Date of Patent: Feb. 19, 2019

(54) LOCAL CHANNELS ANYWHERE

(71) Applicant: AT&T Intellectual Property I, L.P., Atlanta, GA (US)

(72) Inventors: Michael S. Thomas, Woodstock, GA (US); Wes G. Costner, Dallas, GA (US); Adam Ferman, Plymouth, IN (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/627,115

(22) Filed: Jun. 19, 2017

(65) Prior Publication Data

US 2017/0288800 A1 Oct. 5, 2017

Related U.S. Application Data

(63) Continuation of application No. 14/292,533, filed on May 30, 2014, now Pat. No. 9,686,032.

(51) Int. Cl.

| | |
|---|---|
| *H04H 60/92* | (2008.01) |
| *H04H 60/91* | (2008.01) |
| *H04H 20/57* | (2008.01) |
| *H04W 4/02* | (2018.01) |
| *H04H 60/51* | (2008.01) |
| *H04H 60/63* | (2008.01) |

(Continued)

(52) U.S. Cl.
CPC ............ *H04H 60/92* (2013.01); *H04H 20/57* (2013.01); *H04H 60/15* (2013.01); *H04H 60/51* (2013.01); *H04H 60/63* (2013.01); *H04H 60/85* (2013.01); *H04H 60/91* (2013.01); *H04W 4/02* (2013.01)

(58) Field of Classification Search
CPC ........ H04H 60/92; H04H 60/15; H04H 60/63; H04H 60/85; H04H 20/57; H04H 60/91; H04H 60/51; H04W 4/02
See application file for complete search history.

(56) References Cited

U.S. PATENT DOCUMENTS

| | | |
|---|---|---|
| 6,741,841 B1 | 5/2004 | Mitchell |
| 6,885,863 B2 | 4/2005 | Parkman et al. |

(Continued)

OTHER PUBLICATIONS

Song, Songbo, Hassnaa Moustafa, and Hossam Afifi. "Context-aware iptv," Wired-Wireless Multimedia Networks and Services Management. Springer Berlin Heidelberg, 2009. 189-194. http://dl.acm.org/citation.cfm?id=1692852.

*Primary Examiner* — Marcos L Torres
(74) *Attorney, Agent, or Firm* — Jackson Walker L.L.P.

(57) ABSTRACT

A mobile viewing method includes accessing location information indicative of a current location of a mobile device associated with a home market. A current market corresponding to the current location of the mobile device is identified. If the current market differs from the home market, the mobile device is granted access to a retransmission of at least one local channel of the current market. The location information may include GPS information indicative of GPS coordinates of the mobile device. The mobile device may include a mobile viewing application that displays a channel guide indicating local channels available in the current market and national channels. The mobile viewing application may include a summary of the current market and the summary may include weather, news headline, and local advertisement information.

20 Claims, 4 Drawing Sheets

(51) Int. Cl.
*H04H 60/15* (2008.01)
*H04H 60/85* (2008.01)

(56) References Cited

U.S. PATENT DOCUMENTS

| | | |
|---|---|---|
| 7,313,375 B2 | 12/2007 | Lee et al. |
| 8,204,432 B2 | 6/2012 | Girard et al. |
| 8,356,328 B2 | 1/2013 | Minter et al. |
| 8,407,754 B2 | 3/2013 | Blanchard et al. |
| 2004/0031050 A1 | 2/2004 | Klosterman |
| 2005/0213938 A1* | 9/2005 | Ozawa .................. H04N 5/445 386/244 |
| 2008/0172706 A1 | 7/2008 | Robinson et al. |
| 2009/0007187 A1 | 1/2009 | Koul |
| 2009/0075585 A1 | 3/2009 | Klein |
| 2009/0115913 A1 | 5/2009 | Hsu et al. |
| 2009/0222874 A1 | 9/2009 | White et al. |
| 2011/0014899 A1* | 1/2011 | Cugnini ............. H04N 7/17318 455/414.1 |
| 2011/0125583 A1 | 5/2011 | Hao |
| 2011/0283323 A1* | 11/2011 | Ramsdell ............... H04H 60/43 725/50 |
| 2012/0072933 A1 | 3/2012 | Moore |
| 2012/0272270 A1* | 10/2012 | Boyer .................... H04N 5/445 725/39 |
| 2013/0120666 A1 | 5/2013 | Sharif-Ahmadi et al. |
| 2013/0145403 A1 | 6/2013 | Sofos et al. |
| 2013/0179923 A1 | 7/2013 | Lee et al. |
| 2013/0347021 A1 | 12/2013 | Joong et al. |
| 2014/0173679 A1 | 6/2014 | Kimura et al. |
| 2015/0172731 A1 | 6/2015 | Hasek et al. |

* cited by examiner

LOCAL CHANNELS ANYWHERE

The present patent application is a continuation of U.S. patent application Ser. No. 14/292,533, filed May 30, 2014, issuing as U.S. Pat. No. 9,686,032 on Jun. 20, 2017.

BACKGROUND

Field of the Disclosure

Disclosed subject matter is in the field of multimedia delivery services and, more particularly, mobile access to multimedia content on a mobile device.

Description of the Related Art

Multimedia service providers that deliver content via cable, satellite, and IP access networks typically provide content associated with local channels and content associated with other channels, which may be referred to herein as national channels. Local channels include retransmissions of locally broadcasted channels. Service providers may also offer a subscriber wireless access to content via the subscriber's mobile device. It may, however, be difficult to reconcile mobile device access and retransmitted local channel content when the subscriber travels to a location outside of the subscriber's home market.

DESCRIPTION OF THE EXEMPLARY EMBODIMENTS

Mobile access to content provided to a subscriber by a multimedia service provider may include mobile viewing features, applications, and methods performed by a server operated by a service provider and features, applications, and methods performed by a mobile device of a subscriber. In at least one embodiment, the mobile access server may perform a method that includes receiving, obtaining, or otherwise accessing location information indicative of a current location of the subscriber's mobile device and identifying a current market corresponding to the mobile device's current location. If the current market differs from a home market, which is the market associated with the subscriber's account, the mobile device is granted access to a retransmission of a local channel of the current market.

Granting the mobile device access to the retransmission of the local channel may occur in response to receiving a request for local programming from a mobile viewing application installed on the mobile device. The location information may include, GPS information indicative of GPS coordinates of the mobile device, cellular network information indicative of a location of a cellular base station in proximity to the mobile device, or other suitable navigation information.

Granting the mobile device access to the retransmission of a local channel may include wirelessly streaming local channel content to the mobile device. The mobile access server may include or communicate with a web-accessible streaming server to stream the local channel content and the mobile viewing application may access the streaming server via a wireless Internet connection. The wireless connection may be a WiFi connection or a 3G, 4G, or subsequent generation of a cellular connection.

In at least one embodiment, the mobile access server may provide the mobile viewing application with available channel information including, as an example, an available channel menu or listing. The available channel menu may distinguish local channels from other channels, for example, by including a locality indicator adjacent to available local channels or by indicating local channels separately from other channels.

The mobile access server may support or provide additional optional features in connection with the mobile viewing application. For example, the mobile access server may provide current market summary information, including as non-limiting examples, a weather summary indicative of a weather forecast for the current market, a headline summary indicative of a news story associated with the current market, and a local advertisement advertising a business or service provided in the current market. The mobile viewing application may display any one or more of the current market summary information to the subscriber. As another example of an optional feature, the mobile viewing application may include a user-selectable option to view a local differences window and the mobile access server may respond to user selection of the local differences option by providing the mobile viewing application with information indicative of differences between local channel content accessible in the subscriber's home market and local content accessible in the current market.

In addition to methods performed by a mobile access server, disclosed subject matter encompasses the mobile access server itself as well as the computer executable instructions that, when executed by the processor, cause the mobile access server to perform disclosed methods. Disclosed subject matter also encompasses methods performed by the mobile device and computer executable instructions of the mobile viewing application, which when executed by the mobile device, cause the mobile viewing device to perform the applicable methods.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Figure 1:
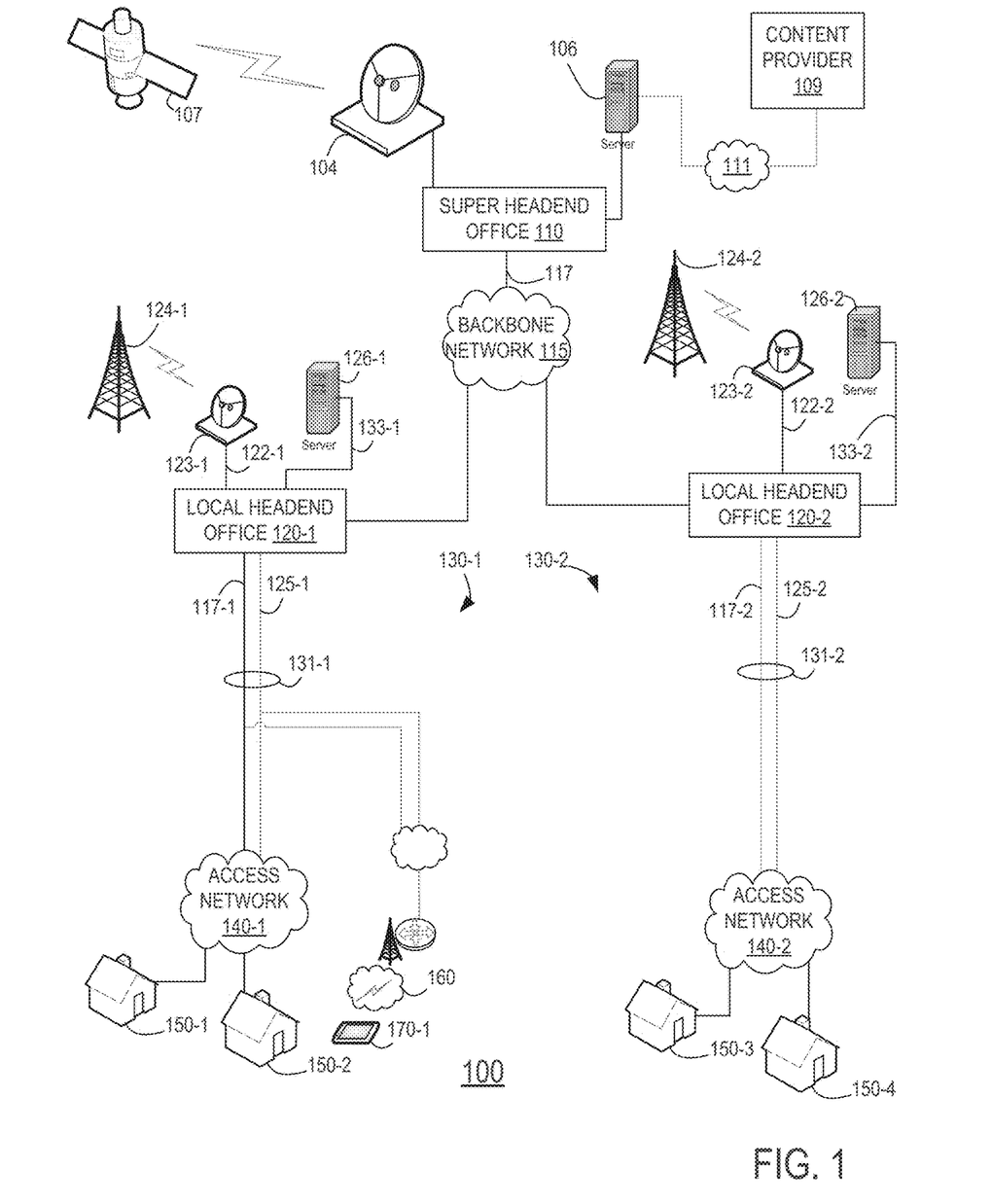
FIG. 1 illustrates a multimedia delivery platform.

Turning now to the drawings, FIG. 1 illustrates a multimedia delivery network 100 enabling a multimedia service provider to provide, to its subscribers, a multimedia delivery service that includes a mobile viewing service with a local channels anywhere feature. The elements of multimedia delivery network 100 depicted in FIG. 1 are described to provide context for the mobile viewing application and service described in the subsequent figures The multimedia delivery network 100 illustrated in FIG. 1 represents a tiered delivery network including a first tier that includes a super headend office 110 and a second tier that includes multiple local headend offices including a first local headend office 120-1 and a second local headend office 120-2 depicted in FIG. 1.

In at least one embodiment, super headend office 110 includes acquisition resources for acquiring content distributed nationally and referred to herein as national content. National content includes, as an example, content made available to subscribers in more than one of the local headend offices 120. The acquisition resources of the super headend office 110 illustrated in FIG. 1 include, as non-limiting examples, a dish antenna 104 to acquire content transmitted by a communication satellite 107 and a headend server 106 to acquire content distributed from a content provider 109 via a broadband network 111. Although FIG. 1 illustrates a single dish antenna 104 and a single headend server 106, other embodiments may include more or different acquisition resources than those shown in FIG. 1.

In the tiered embodiment of multimedia delivery network 100 illustrated in FIG. 1, super headend office 110 processes the content received from its acquisition resources and provides a national content feed 117 to each of its local headend offices 120 through a backbone network 115. Backbone network 115 may be or may include a private network operated and maintained by the service provider of multimedia delivery network 100. Backbone network 115 may be firewall insulated from public networks including the Internet. Backbone network 115 may include a fiber optic network or another suitable media for high-bandwidth transmission of multimedia content from super headend office 110 to a number of local headend offices 120. In some embodiments, multimedia delivery network 100 includes a local headend office 120 in each of a predetermined number of markets. A market may encompass a city and a defined region surrounding the city. For purposes of this disclosure, the local headend offices 120 of multimedia delivery network 100 and the markets serviced by multimedia delivery network 100 correspond one-to-one. In other embodiments, however, a market may include multiple headend offices and a headend office may service multiple markets.

In the multimedia delivery network 100 of FIG. 1, each local headend office 120 receives the national content feed 117 from super headend office 110. In addition, each local headend office 120 includes local acquisition resources including a local acquisition server 126 and one or more dish antennas 123 for receiving local channels 122 broadcast transmitted from one or more corresponding radio towers 124. Local headend office 120 provides a subscriber feed 131 to customer premises 150 via access network 140. The subscriber feed 131 illustrated in FIG. 1 includes the national feed 117 and retransmitted local channels 125. Subscriber feed 131 may also include locally produced content 133 such as various public service and community access channels from local server 126. Locally produced content 133 may also include local advertising, for locally provided goods or services, which may be inserted into national feed 117, retransmitted local channels 125, or both.

The access network 140 illustrated in FIG. 1 may encompass various implementations including, as non-limiting examples, coaxial cable access networks, digital subscriber line and other twisted copper pair access networks, fiber optic access networks, as well as wireless access networks including satellite television access networks.

FIG. 1 illustrates that the subscriber feeds 131 differ for each local headend office 120. As an example, subscriber feed 131-1 generated by local headend office 120-1 differs from subscriber feed 131-2 generated by local headend office 120-2. In some embodiments, the primary difference between subscriber feed 131-1 and subscriber feed 131-2 is the difference between retransmitted local channels 125-1 and retransmitted local channels 125-2. Retransmitted local channels 125-1 represent signals transmitted by corresponding radio towers 124-1 located in market 130-1 while retransmitted local channels 125-2 represent signals transmitted by corresponding radio towers 124-2 located in market 130-2. Similarly, any local advertising inserted into the subscriber feed 131 provided to customer premises 150 may vary with each local headend office 120.

A service provider of multimedia delivery network 100 may elect to offer its subscribers access to subscriber feed 131 from mobile devices 170 including, as non-limiting examples, smart phones and tablet devices, over a wireless network 160 including, as examples, a 3G, 4G, or subsequent generation of mobile telephone network or a wireless fidelity (WiFi) network. Mobile devices are inherently capable of moving from one market to another, e.g., moving from market 130-1 to market 130-2. When a mobile device 170 moves from a first market 130-1 to a second market 130-2, the service provider may determine which market to use with respect to retransmitted local channels 125 in the subscriber feed 131. The inclusion of local content as part of a feed provided to mobile devices may be influenced by regulatory or contractual limitations. For example, the provider of multimedia delivery network 100 may be legally or contractually prohibited from retransmitting a locally broadcast signal transmitted by a first radio transmitter 124-1 in any market 130 other than the first market 130-1 in which the radio transmitter 124-1 is located.

Figure 2:
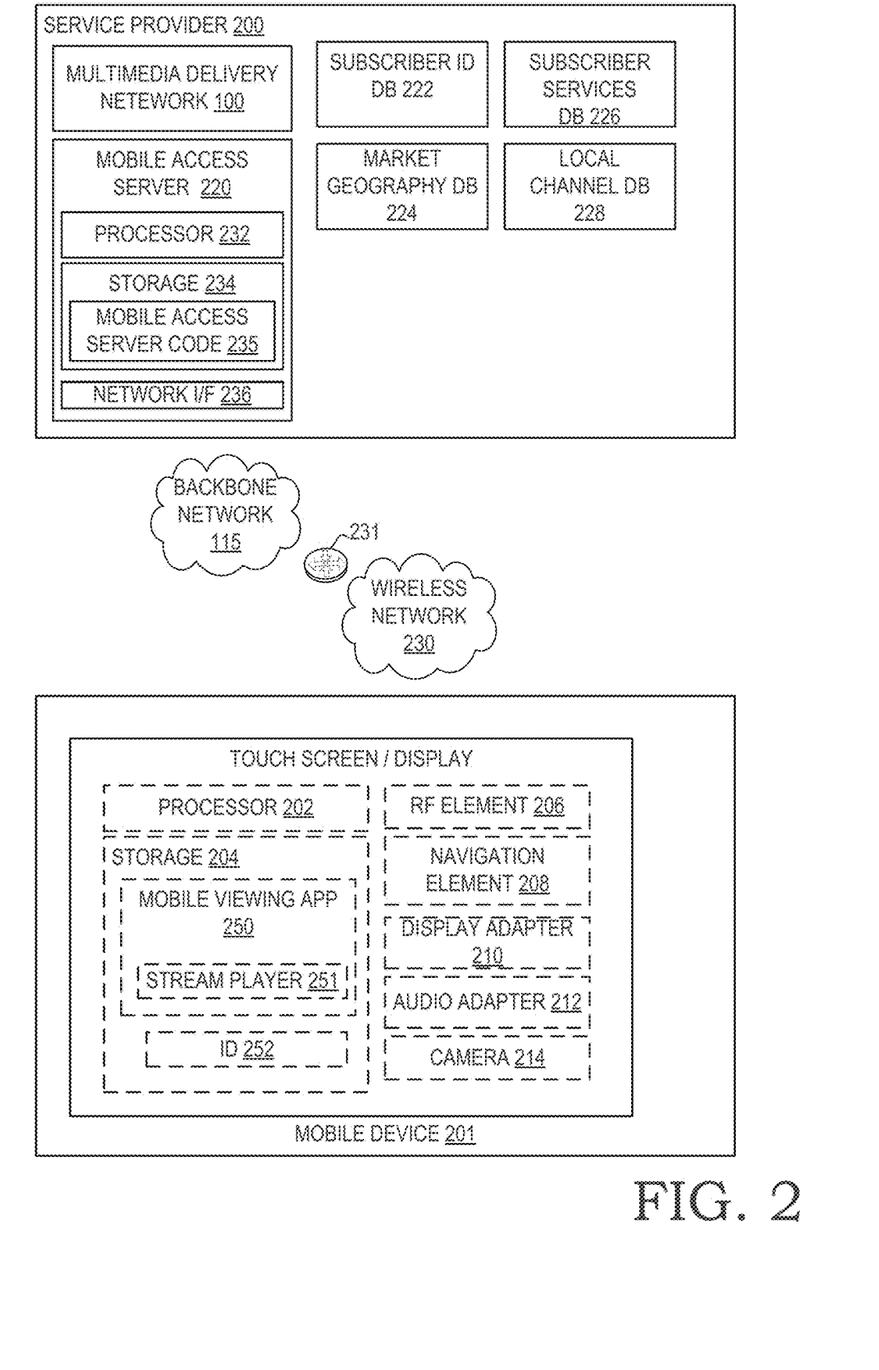
FIG. 2 illustrates a service provider in communication with a mobile device.

Turning now to FIG. 2, elements of a service provider 200 providing a mobile viewing service to a mobile device 201 are illustrated. The service provider 200 illustrated in FIG. 2 encompasses the multimedia delivery network 100 of FIG. 1 as well as a mobile access server 220. The mobile access server 220 illustrated in FIG. 2 includes a processor 232, computer readable memory or storage 234, and a network interface 236. The storage 234 shown in FIG. 2 includes mobile access server code 235. Mobile access server 220 is shown in FIG. 2 as having access to various databases including a subscriber identification database 222, a market geography database 224, a subscriber services database 226, and a local channel data database 228. FIG. 2 illustrates service provider 200 communicating with mobile device 201 through a communication path that includes the backbone network 115 of FIG. 1, a wireless network 230, and one or more gateways 231. Wireless network 230 may employ any of various suitable cellular technologies including, without limitation, 3G, 4G, and subsequent technologies. In other embodiments, wireless network 230 may include an IEEE 802.11 compliant network (WiFi) or another suitable wireless local area network.

The mobile device 201 illustrated in FIG. 2 includes a processor 202 and computer readable storage 204. The storage 204 illustrated in FIG. 2 includes computer executable program instructions for a mobile viewing application 250. The mobile viewing application 250 of FIG. 2 includes a stream player 251. Stream player 251 represents an application for driving a display screen with streaming multimedia content received from service provider 200. Storage 204 illustrated in FIG. 2 also includes identification information 252. Identification information 252 may include information identifying a primary user of mobile device 201, an account number of the primary user, e.g., the primary user's account number with service provider 200, or an identification of mobile device 201 itself. In the latter embodiment, identification information may encompass a globally unique identifier of mobile device 201 including, but not limited to, a subscriber identification module (SIM) card number of mobile device 201 or a media access control (MAC) address of the mobile device 201.

The mobile device 201 illustrated in FIG. 2 is shown further including a radio frequency component 206, which may include a radio frequency transmitter, a radio frequency receiver, and corresponding communication logic. Mobile device 201 further includes a navigation element 208, which may include special-purpose or dedicated hardware and software or a combination thereof designed to interact with a specifically identified device or methodology for determining one's geographic location on earth. Navigation element 208 may include, as one example, global positioning system (GPS) hardware and software. Mobile device 201 further includes a display adapter 210 for interacting with the display device, an audio adapter 212 configured for interfacing with a speaker or other suitable device, and a camera 214. Mobile device 201 may be implemented in a form factor compatible with a smart phone in some embodiments, in other embodiments, mobile device 201 may represent a tablet computing device, a laptop computer, or another suitable wireless-capable computing device.

Figure 3:
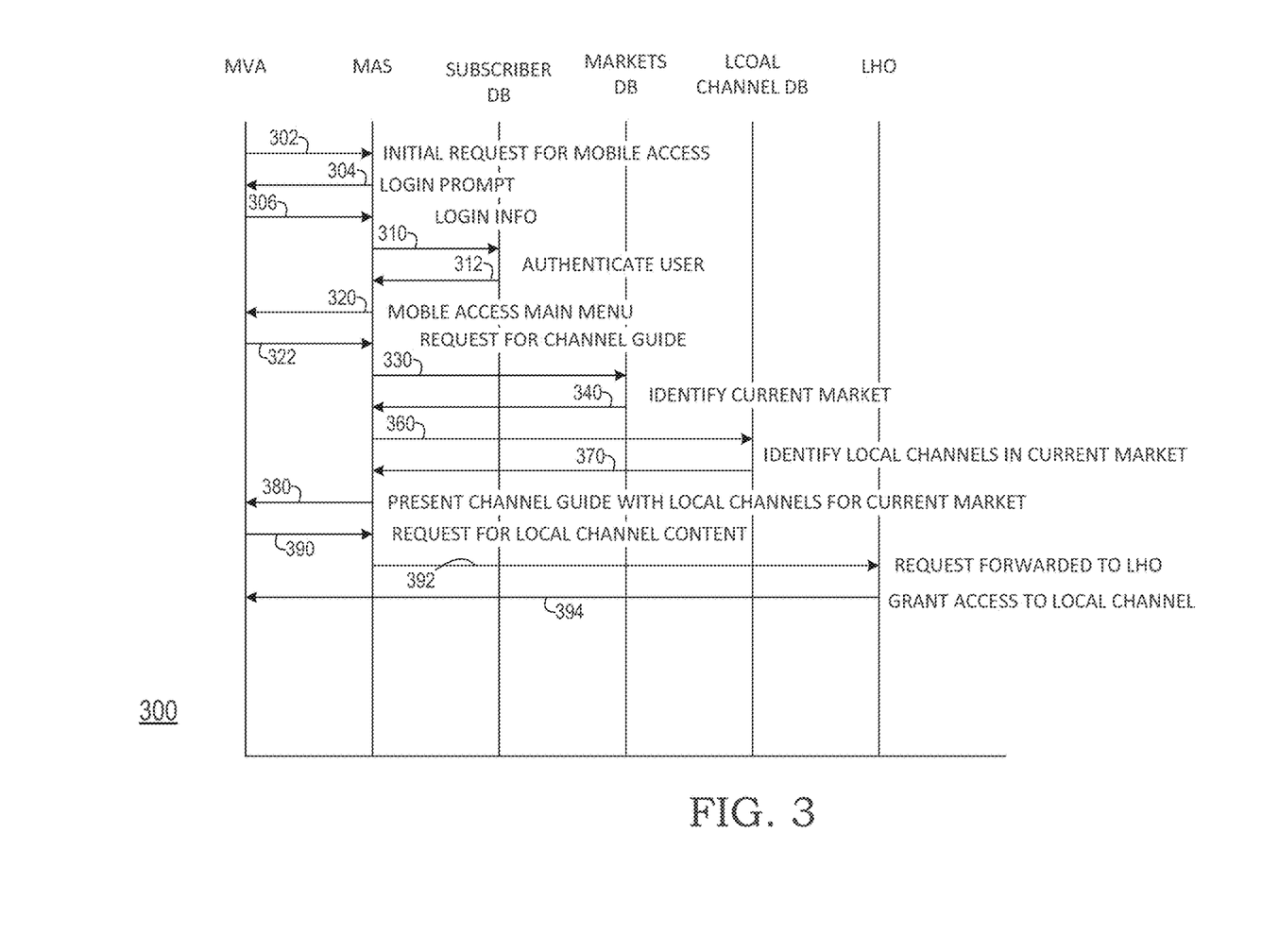
FIG. 3 illustrates operation of a mobile viewing application.

Referring now to FIG. 3, operation of a mobile viewing feature 300 including a local anywhere feature is illustrated. Mobile viewing feature 300 encompasses operations performed by mobile device 201 executing mobile viewing application 250, represented as MVA in FIG. 3 as well as operations performed by mobile access server 220 executing mobile access service code 235, represented as MAS in FIG. 3.

In the embodiment of mobile viewing feature 300 illustrated in FIG. 3, a mobile viewing application transmits (operation 302) a request to the mobile access server. The mobile viewing application 250 may represent a dedicated application residing on the mobile device 201. In other embodiments, the mobile viewing application 250 may represent a general-purpose browser processing executable code of a mobile viewing webpage maintained by the service provider 200. For the sake of clarity and brevity, the mobile viewing application 250 described herein is assumed to be implemented as a dedicated application executable on the mobile device 201. In these embodiments, request 302 may be initiated when the user of mobile device 201 opens or otherwise executes mobile viewing application 250. The request 302 is transmitted to the mobile access server 220 which responds with a login prompt (operation 304) that is returned to mobile viewing application 250. Mobile viewing application 250 may then respond to login prompt 304 by returning user specified authentication information 306, which may include a user ID and password or another form of information suitable for authenticating the user of the mobile device as the authorized user.

The mobile access server responds to receiving the login information in operation 306 by accessing subscriber identification database 222 in operation 310 to retrieve information specific to the subscriber for authentication against the information provided by the user. The subscriber may, in some embodiments, associate the mobile device 201 with a particular subscriber identification and thereby simplify the login process. In these embodiments, the request 302 may include an identifier of mobile device 201, a user of mobile device 201, or a service provider account associated with mobile device 201 after which the user may need only enter a password or other form of authentication information. Following the retrieval of subscriber information by mobile access server 220 at operation 310, subscriber identification database 222 provides (operation 312) information corresponding to the subscriber and returns this information to mobile access server, enabling the mobile access server to authenticate the user. Mobile viewing feature 300 includes a sequence, not depicted in FIG. 3, for re-prompting the user or denying access to the user if the user is unable to provide authentication information.

Having authenticated the user, the mobile access server may then provide the mobile viewing application with a main menu at operation 320. The main menu provided to the mobile viewing application may include menu options such as configuration settings, content selection options, channel guide options, and other features. In the example illustrated in FIG. 3, the mobile viewing application user selects a channel guide option at operation 322 from the main menu interface.

In at least one embodiment, the mobile viewing application generates a channel guide menu or interface wherein the channel guide interface includes at least two sections, a national channel section and a local channels section, as further described below with respect to FIG. 4. The national channel section of the channel guide interface includes all channels of national distribution provided to the subscriber by provider 201. The local channels section, in at least one embodiment, includes local channels corresponding to the market in which the user is currently located. Thus, if a user travels to a different market, the user may, nevertheless, open the mobile viewing application on the user's phone and gain access to the local channels in the user's current location.

The mobile viewing application of FIG. 3 includes a local channel determination process by accessing a markets database at operation 330. The markets database includes information that identifies a market of the service provider based on navigation information or geographic information provided by mobile viewing application 250. The mobile viewing application may periodically provide or record navigation information indicative of the user's current location. The location information may be pushed out to the mobile access server periodically or from time to time or polled from time to time by mobile access server 220. In either case, the mobile access server obtains location information indicative of a current location of the mobile device. Depending upon the navigation resources available to the mobile device, the location information used by the mobile access server to query the markets database may include global position system coordinates or another suitable form of navigation information. For mobile devices that lack global position system functionality, the mobile access server may estimate the location of mobile device 201 based on the mobile device's proximity to a cellular base station or to a wireless access point.

In the operation 330 illustrated in FIG. 3, the mobile access server queries the markets database based on the location information and receives or accesses (operation 340) market information. In at least some embodiments, the market information identifies one of a finite set of markets covered by the service provider in which the subscriber is located.

After mobile access server 220 receives information identifying the current market where the mobile device resides, the illustrated example of method 300 queries (operation 360) a local channel database to retrieve (operation 370) information indicating the local channels associated with the service provider market in which the mobile device is currently located.

The mobile access server, having received local channel information, may forward (operation 380) the local channel information to the mobile viewing application to enable the mobile viewing application to generate a channel guide that includes, in addition to national channels, a section that includes local channels corresponding to the user's current location. In this manner, the mobile viewing application may generate a menu guide interface with a local channel section indicating channels in accordance with the local channel information retrieved in operation 370 as well as a national channel section including national channels provided according to the subscriber's service. For example, the national channels section in the menu user guide generated by the mobile device may include specific premium channels to which the user subscribes as well as generally available channels.

The mobile viewing application may then generate and display a channel guide to the mobile device user. If the user selects a local channel listed in the channel guide, the mobile viewing application provides (operation 390) the mobile access server with information indicative of the user's selection and the mobile access server forwards (operation 392) the request to the local headend office. The local headend office, upon receiving the request may then grant access to (operation 394) or otherwise provide the requested local channel to the mobile viewing application. In this case, the local channel may be received or viewed by the mobile device user by forwarding or retransmitting the requested content from the local headend office to the mobile viewing application.

As described in the preceding description of method 300, a mobile viewing application enables a user to access a familiar interface regardless of the user's location and have the interface reflect national channels that the user can access anywhere in one section and local channels that are specific to the user's current location in another region.

Recognizing that retransmission limitations on local headend operators prevent the unencumbered use of locally broadcast signals in a retransmission to a mobile device, the use of currently local channels beneficially enables a mobile user to gain access to local channels regardless of location. In addition, access to local channels provides the mobile device user with information that is relevant to the user's current location. This information could include, as examples, local weather information, local news headlines, and local advertising. By providing local channels to visitor from other markets, the mobile viewing application beneficially expands the potential viewership of local channels and locally produced advertisement and content and thereby potentially increases the value of the local broadcasts and local advertising time.

Figure 4:
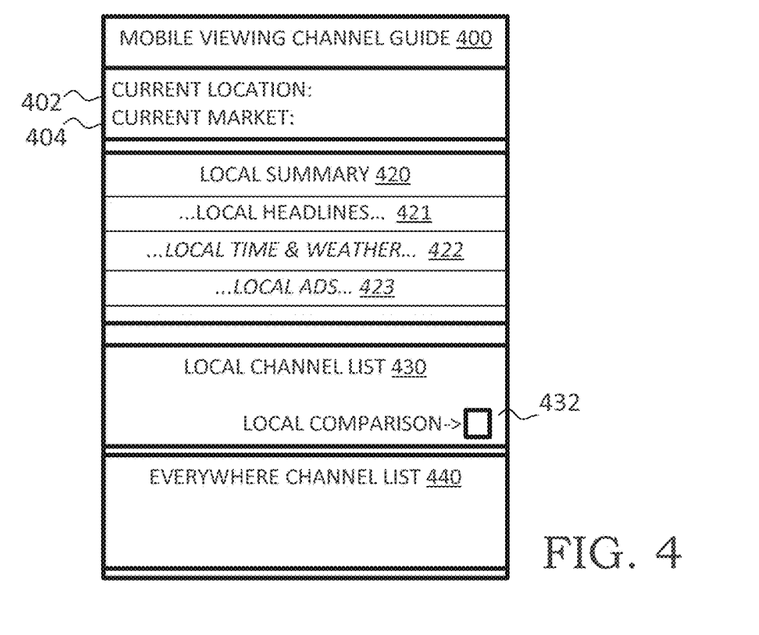
FIG. 4 illustrates a channel guide interface of a mobile viewing application.

Turning now to FIG. 4, an example mobile viewing channel guide 400 is illustrated. The mobile viewing channel guide 400 illustrated in FIG. 4 includes a local channel list 430, an everywhere channel list 440, and an optional local summary 420. In addition, the mobile viewing guide 400 illustrated in FIG. 4 optionally includes current location information 402 which may be presented to the user as GPS information, or town and state information, or in some other suitable format, and current market information 404, which may indicate the service provider market associated with the user's current location. In some embodiments, the current market corresponds to the local headend office that serves the user's current location. Although the mobile viewing guide depicted in FIG. 4 includes various elements including current location information 402 and current market information 404, other implementations may omit this information or include additional other information as appropriate.

The local summary 420 of FIG. 4 may include various pieces of information corresponding to the user's current location. The illustrated mobile viewing channel guide 400 includes, in the local summary 420, local headlines 421, local time and weather information 422, and one or more local ads 423. In some embodiments, the local summary information may be selectable in a manner that permits the user to expand or display the local summary items or to hide the local summary items from display to increase the size of the other windows. Similarly, the local summary 420 may be implemented with user selectable configuration settings that enable the user to choose which pieces of local information to include in the local summary 420.

The local channel list 430 lists the retransmitted local channels available to the user at the user's current location within the current market. Thus, for example, local channel list 430 lists the retransmissions of broadcasted network signals received by the local headend office associated with the user's current market. The local channel list 430 may further include other channels provided by the local headend office including, for example, public service announcement channels of the local city government, a local school board, or a community access channel.

The local channel list 430 illustrated in FIG. 4 includes an optional local comparison selection box 432. In some embodiments, the local comparison selection box 432, when checked or otherwise indicated by user selection, generates a local channel comparison described below with respect to FIG. 5. Mobile viewing channel guide 400 may further include an everywhere channel list section 440 indicating a list of channels available based upon the user's current subscription package and independent of the user's current location. In some embodiments, the list of local channels and national channels may be automatically modified in accordance with signal strength or bandwidth currently available to the mobile device. If for example, the subscriber subscribes to a high definition package and the mobile device is not currently receiving a broadband signal, the channel guide may omit high definition channels.

Figure 5:
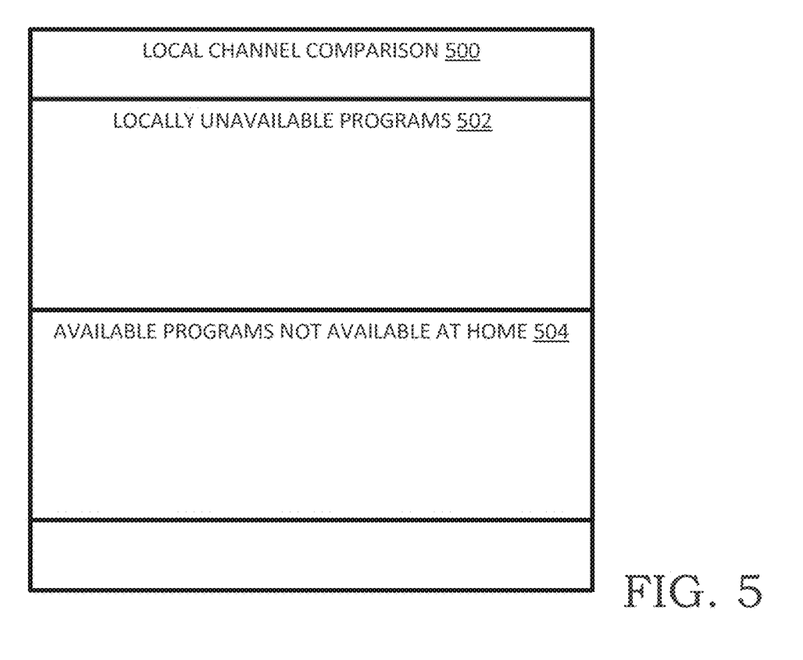
FIG. 5 illustrates a local channel comparison interface.

Referring now to FIG. 5, a local channel comparison interface 500 is illustrated. The illustrated local channel comparison provides, to the user, a summary of differences between content the user would have access to within the user's home market versus the content available to the user at the user's current location. The local channel comparison 500 illustrated in FIG. 5 includes for example, a first section 502 indicating programs available at the user's home market that are unavailable to the user at the current location. For example, a locally or regionally telecasted athletic contest available at the user's home markets but not available at the user's current location would be identified. Conversely, programs available at the user's current location that would not be available to the user at home are indicated in a second window 504. The local channel comparison feature may beneficially enable the user to determine quickly differences in content associated with the user's current location.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method for providing content to a mobile device, wherein the method comprises:

sending, by a mobile device of a subscriber to a cellular communication service provided by a service provider, a channel guide request to the service provider via a communication path comprising a cellular network of the service provider and a backbone network coupled to the cellular network, wherein the backbone network comprises a private network operated by the service provider, wherein:

the service provider further provides a multimedia delivery service to the subscriber, wherein the service provider operates:
   a first local headend in a first location;
   a second local headend in a second location; and
   a super headend coupled to the first local headend and the second local headend via the backbone network;
the first local headend generates a first program guide corresponding to first headend content, wherein:
   the first headend content includes:
      first local content comprising retransmissions of content terrestrially broadcast by one or more broadcasters located proximal to the first headend; and
      super headend content received from the super headend; and
   the first program guide includes guide information for:
      first local channels comprising channels carrying the first local content; and
      super headend channels comprising channels carrying the super headend content;
the second local headend generates a second program guide corresponding to second headend content, wherein:
   the second headend content includes:
      second local content comprising retransmissions of content terrestrially broadcast by one or more broadcasters located proximal to the second headend; and
      the super headend content; and
   the second program guide includes guide information for:
      second local channels comprising channels carrying the second local content; and
      the super headend channels;
the customer premises equipment is associated with a premises located proximal to the first local headend;
the multimedia delivery service provides the first headend content to the customer premises device; and
receiving, by the mobile device, a particular program guide determined based on a location of the mobile device, wherein the particular program guide comprises:
   the first program guide when the mobile device is proximal to the first local headend; and
   the second program guide when the mobile device is proximal to the second local headend.

2. The method of claim 1, wherein the particular program guide includes a local section in which guide information for local channels is included and a super headend section in which guide information for super headend channels is located.

3. The method of claim 1, wherein the mobile device comprises a smart phone.

4. The method of claim 1, further comprising:
sending, by the mobile device, GPS information indicative of GPS coordinates of the mobile device.

5. The method of claim 1, wherein the first headend content feed comprises streaming content from a streaming server.

6. The method of claim 1, wherein the first content feed and the second content feed include the same content when the closest headend comprises a headend of the service provider closest to the customer premises equipment.

7. The method of claim 1, wherein the particular program guide includes locality information indicative of which channels are local channels.

8. The method of claim 1, wherein the particular program guide includes location summary information, including:
   a weather forecast for the particular location; and
   a local advertisement advertising a business or service provided in the particular location.

9. The method of claim 8, wherein the particular program guide information is indicative of differences between the first local channels and the second local channels.

10. A non-transitory computer readable medium, including program instructions, executable by a processor, the instructions, when executed by the processor, causing the processor to perform operations comprising:
sending, by a mobile device of a subscriber to a cellular communication service provided by a service provider, a channel guide request to the service provider via a communication path comprising a cellular network of the service provider and a backbone network coupled to the cellular network, wherein the backbone network comprises a private network operated by the service provider, wherein:
   the service provider further provides a multimedia delivery service to the subscriber, wherein the service provider operates:
      a first local headend in a first location;
      a second local headend in a second location; and
      a super headend coupled to the first local headend and the second local headend via the backbone network;
   the first local headend generates a first program guide corresponding to first headend content, wherein:
      the first headend content includes:
         first local content comprising retransmissions of content terrestrially broadcast by one or more broadcasters located proximal to the first headend; and
         super headend content received from the super headend; and
      the first program guide includes guide information for:
         first local channels comprising channels carrying the first local content; and
         super headend channels comprising channels carrying the super headend content;
   the second local headend generates a second program guide corresponding to second headend content, wherein:
      the second headend content includes:
         second local content comprising retransmissions of content terrestrially broadcast by one or more broadcasters located proximal to the second headend; and
         the super headend content; and
      the second program guide includes guide information for:
         second local channels comprising channels carrying the second local content; and
         the super headend channels;

the customer premises equipment is associated with a premises located proximal to the first local headend; and the multimedia delivery service provides the first headend content to the customer premises device; and receiving, by the mobile device, a particular program guide determined based on a location of the mobile device, wherein the particular program guide comprises:

the first program guide when the mobile device is proximal to the first local headend; and the second program guide when the mobile device is proximal to the second local headend.

11. The non-transitory computer readable medium of claim 10, wherein the particular program guide includes a local section in which guide information for local channels is included and a super headend section in which guide information for super headend channels is located.

12. The non-transitory computer readable medium of claim 10, wherein the mobile device comprises a smart phone.

13. The non-transitory computer readable medium of claim 10, wherein the operations further include:

sending, by the mobile device, GPS information indicative of GPS coordinates of the mobile device.

14. The non-transitory computer readable medium of claim 10, wherein the first headend content feed comprises streaming content from a streaming server.

15. The non-transitory computer readable medium of claim 10, wherein the first content feed and the second content feed include the same content when the closest headend comprises a headend of the service provider closest to the customer premises equipment.

16. A mobile device, wherein the mobile device comprises:

a processor; and a wireless transceiver configured for wireless communication via a cellular network;

a computer readable medium, including program instructions, executable by a processor, the instructions, when executed by the processor, causing the processor to perform operations comprising:

sending, by a mobile device of a subscriber to a cellular communication service provided by a service provider, a channel guide request to the service provider via a communication path comprising a cellular network of the service provider and a backbone network coupled to the cellular network, wherein the backbone network comprises a private network operated by the service provider, wherein:

the service provider further provides a multimedia delivery service to the subscriber, wherein the service provider operates:

a first local headend in a first location;

a second local headend in a second location; and a super headend coupled to the first local headend and the second local headend via the backbone network;

the first local headend generates a first program guide corresponding to first headend content, wherein:

the first headend content includes:

first local content comprising retransmissions of content terrestrially broadcast by one or more broadcasters located proximal to the first headend; and super headend content received from the super headend; and the first program guide includes guide information for:

first local channels comprising channels carrying the first local content; and super headend channels comprising channels carrying the super headend content;

the second local headend generates a second program guide corresponding to second headend content, wherein:

the second headend content includes:

second local content comprising retransmissions of content terrestrially broadcast by one or more broadcasters located proximal to the second headend; and the super headend content; and the second program guide includes guide information for:

second local channels comprising channels carrying the second local content; and the super headend channels;

the customer premises equipment is associated with a premises located proximal to the first local headend; and the multimedia delivery service provides the first headend content to the customer premises device; and receiving, by the mobile device, a particular program guide determined based on a location of the mobile device, wherein the particular program guide comprises:

the first program guide when the mobile device is proximal to the first local headend; and the second program guide when the mobile device is proximal to the second local headend.

17. The mobile device of claim 16, wherein the particular program guide includes a local section in which guide information for local channels is included and a super headend section in which guide information for super headend channels is located.

18. The mobile device of claim 16, wherein the particular program guide includes locality information indicative of which channels are local channels.

19. The mobile device of claim 16, wherein the particular program guide includes location summary information, including:

a weather forecast for the particular location; and a local advertisement advertising a business or service provided in the particular location.

20. The mobile device of claim 16, wherein the particular program guide information is indicative of differences between the first local channels and the second local channels.

* * * * *